United States Patent [19]
White

[11] Patent Number: 6,145,635
[45] Date of Patent: Nov. 14, 2000

[54] SPRING BRAKE

[75] Inventor: Hollis Newcomb White, Hopkinsville, Ky.

[73] Assignee: White Hydraulics Inc., Hopkinsville, Ky.

[21] Appl. No.: 09/103,631

[22] Filed: Jun. 23, 1998

[51] Int. Cl.[7] .................................................. F16D 66/00
[52] U.S. Cl. ...................... 188/170; 188/71.5; 188/72.3
[58] Field of Search .................. 188/72.3, 71.5, 188/71.6, 170, 218; 192/18 A, 70.12, 70.2, 70.21, 70.27, 113.34, 70.28

[56] References Cited

U.S. PATENT DOCUMENTS

| | | | |
|---|---|---|---|
| 4,263,991 | 4/1981 | Morgan et al. | 188/170 |
| 4,286,694 | 9/1981 | Wiseman, Jr. et al. | 188/71.5 |
| 4,356,901 | 11/1982 | Koehler et al. | 192/70.2 |
| 4,548,306 | 10/1985 | Hartz | 188/72.3 |
| 4,615,418 | 10/1986 | Atwell | 188/170 |
| 4,802,564 | 2/1989 | Stodt | 188/71.5 |
| 4,805,744 | 2/1989 | Pringle | 188/71.5 |
| 5,085,295 | 2/1992 | Wautelet et al. | 188/73.2 |
| 5,186,284 | 2/1993 | Lamela et al. | 188/71.8 |
| 5,388,679 | 2/1995 | Inoue et al. | 192/35 |
| 5,389,049 | 2/1995 | Mabee | 188/72.3 |
| 5,495,927 | 3/1996 | Samie et al. | 192/70.12 |
| 5,850,895 | 12/1998 | Evrard | 188/264 A |

*Primary Examiner*—Christopher P. Schwartz
*Attorney, Agent, or Firm*—Lightbody & Lucas

[57] ABSTRACT

A brake assembly for a shaft including a series of brake disks interconnected to the shaft by rectangular tabs with the interleaved reaction disks interconnected to the housing by accurately positioned pins, which pins are located in grooves in the reaction disks and radially surrounding the housing respectively.

28 Claims, 5 Drawing Sheets

SPRING BRAKE

FIELD TO WHICH THE INVENTION RELATES

This invention relates to a brake shaft such as that utilized in a combination axle support and brake mechanism.

BACKGROUND OF THE INVENTION

Brake shafts have been utilized to control power from a positive mechanism (such as a motor) to a negative mechanism (such as a brake). In some instances, the same brake shaft has been utilized for a secondary purpose, such as functioning as an axle for a wheel or a rotary support for a secondary member (such as a winch spool). Most interleaved disk brakes utilize a substantially triangular spline to spline interconnection for their interconnections of the disks to their respective members, shaft, or housing. This spline interconnection typically requires machining or some other additional operation to form the splines. In addition, the tolerances of the splines allow for a measure of movement of the shaft in respect to the housing when the brake is engaged.

One application for brake shafts is as a combined axle and brake mechanism for scissorlifts. An example of this is the hydraulically released spring applied brake mechanism of Genie Industries of Redmond, Washington. However, the cost of this particular unit is sufficiently high that most manufactures of scissorlifts use live axles with separate drum brake mechanisms taken from a small automobile instead. These axle assemblies take hours of time to assemble and install. Others use a split-axle in the back, with the brakes being either thereon or on the motor drive systems of the front wheels.

SUMMARY OF THE INVENTION

It is an object of this invention to allow for the substantially complete manufacture of parts of a brake shaft and housing, each mechanism at a single machine with a single setup.

It is an object of this invention to reduce the cost of brakes.

It is an object of this invention to increase the strength of brakes.

It is an object of this invention to manufacture higher quality brakes.

It is an object of this invention to lower the tolerances in brakes.

It is a further object of this invention to increase the speed of manufacture of brakes.

Other objects and a more complete understanding of the invention may be had by referring to the drawing in which:

DETAILED DESCRIPTION OF THE INVENTION

Figure 1:
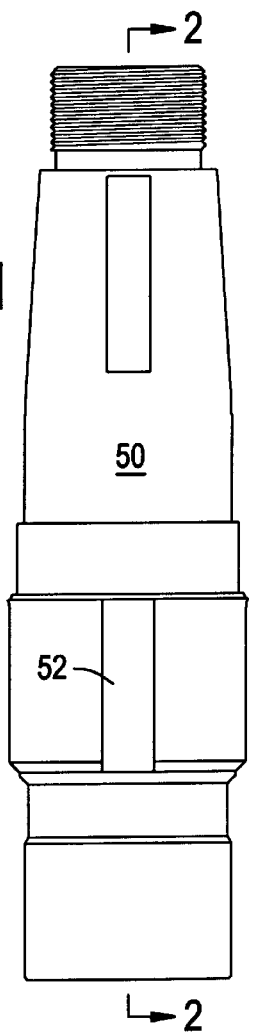
FIG. 1 is a side view of a brake shaft built in accord with the invention.
Figure 2:
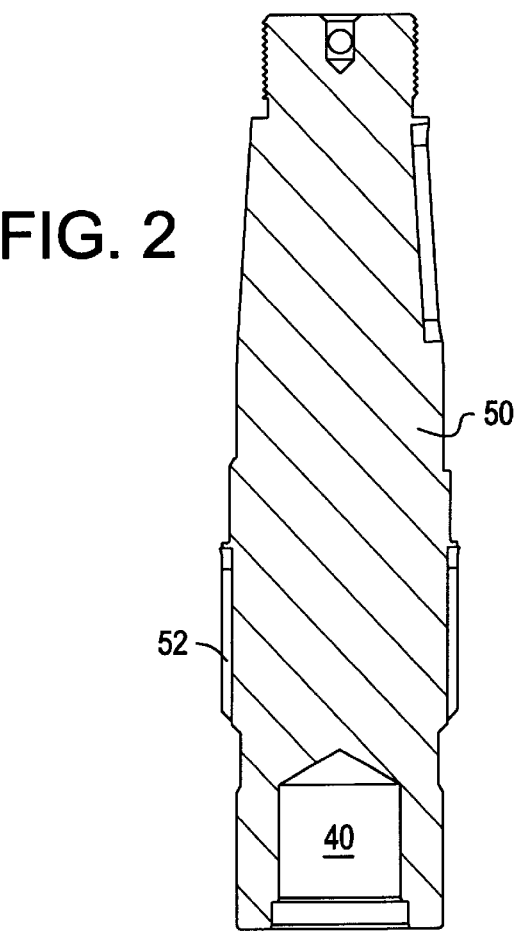
FIG. 2 is a cutaway cross-section of the brake shaft of FIG. 1 taken along lines 2—2 of that figure.
Figure 3:
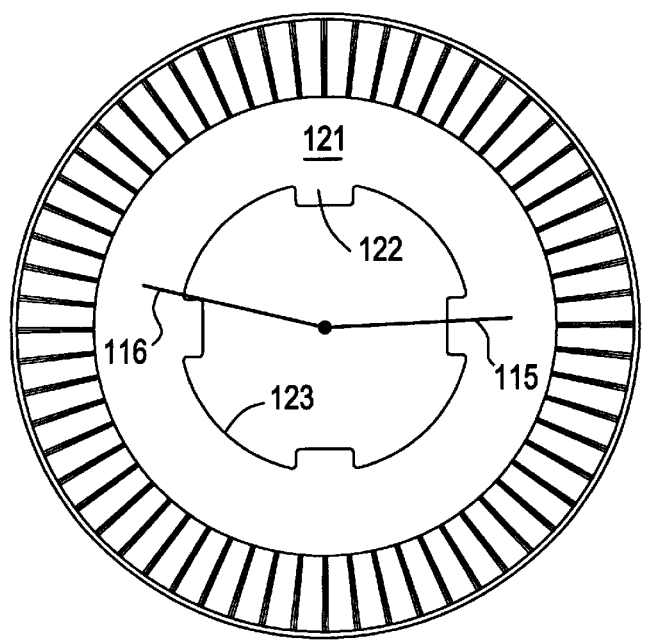
FIG. 3 is a side view of a friction disk utilized with the brake haft of FIG. 1.

This invention relates to a brake assembly 10. The brake assembly 10 has a housing 20, a shaft 50 and a brake mechanism 100.

The housing 20 serves to rotatively support the shaft 50 and anything attached thereto to an associated vehicle (not shown) as well as providing a location for the brake mechanism 100. The particular housing disclosed is of two-part construction having a front 21 and a back 22 with a cavity 30 therebetween.

The front 21 of the housing has substantially all the machined surfaces formed therein and therefrom one side thereof. This facilitates the alignment of the machined surfaces thereby reducing the cost of the brake assembly 10 as well as increasing service life. The four major concentric surfaces which are machined in the front of the housing shown include the area surrounding the oil seal 60, a reaction surface 80 for the brake mechanism, a cavity 70 for the outside race of the bearing, and the two surfaces 101, 102 radially outward of the activating piston for the brake mechanism 100. The additional lateral end 23 of the front of the housing 21 where it abuts the back 22 of the housing is also machined.

In respect to the back 22 of the housing, the major areas which are machined include the location of the main housing seal 24 and the rear bearing 26 (in the design shown only the latter-is critical). In this respect, a reduced area 27 in combination with aggregate clearances about such reduced area 27 eliminates the need to machine most of the inner-surface of the back 22 of the housing while also providing for an integral reservoir for the oil which is contained in the cavity 30 of the housing.

The shaft 50 is rotatively supported to the housing 20 by front and back bearings, in the particular embodiment disclosed a main roller bearing 71 and an inner needle bearing 26.

The inner race for the main bearing 71 shown is machined directly onto the shaft 50, thus allowing for a stronger bearing 71 for its given diameter.

The oil seal 60 is located directly next to the main bearing 71 in a seal cavity formed in the housing 20.

On the other side of the main bearing 71 a small protrusion 51, extending outwardly of the inner race for the main bearing, cooperates with the main bearing 71 to locate the shaft 50 axially in the housing while also aiding in retaining the shaft 50 in location in respect to the remainder of the brake assembly 10.

A thrust bearing 25 off of the end of the drive shaft retains such shaft axially at the inner end thereof.

If desired, the shaft 50 can be splined and interconnected to a drive mechanism. Examples include a unit wherein the inside opening 40 in the drive shaft 50 would be splined and the back 22 is replaced by a White Hydraulics, Inc hydraulic power unit connected to such splines (such as that in White U.S. Pat. No. 4,877,383, the contents of which are incorporated by reference), an electric motor, or other power unit.

The brake mechanism 100 preferably surrounds the shaft 50 located between the two bearings 71 and 26. This allows the bearings to primarily absorb any radial forces on the shaft 50.

The brake assembly shown is spring activated and hydraulic pressure released. If desired, alternate activation mechanism can be utilized such as pressure applied spring released brakes, mechanical activation, and other systems.

In the embodiment disclosed, a number of actuation springs 110 are located substantially equally spaced about the shaft 50 within a concentric activation cavity in the back 22 of the housing. The springs are retained radially in position by a circumferential extension 28 of the back of the housing and circumferentially located by small pockets 111 formed in the piston 120 of the brake mechanism 100. Alternately the activation springs 110 could be located by pins in either or both of the back 22 of the housing or the piston 120, by holes drilled in the back of the housing 22 adjacent thereto, or other means.

The piston 120 is the major operating device for the disclosed embodiment. Typically, the actuation springs 110 bias the piston 120 against the brake disks 121, 125 thus to prevent the rotation of the shaft 50. However, upon selective interconnection of the port 130 to a source of high pressure, the deactivation cavity 131 is pressurized, thus overcoming the force of actuation spring 110 so as to release the brake. Two seals 132, 133 located between the piston 120 and the surrounding housing 20 retain the pressure in the deactivation cavity 131, thus allowing for this deactivation of the piston 120. The deactivation movement of the piston 120 is typically stopped by the circumferential extension 28 of the actuation spring cavity, thus preventing any damage to the activation springs 110. The extension 28 also aids in continued piston alignment in respect to the deactivation cavity 131.

The rotation of the shaft 50 is selectively prevented by the force of the spring 110 on a set of friction and reaction disks 121, 125. These disks 121, 125 are interleaved with alternating disks interconnected to the shaft 50 or the housing 20 by two innovative methods.

The disks 121 have a series of projections or tabs 122 extending into the inner hole 123 of the friction disk 121. These tabs 122, preferably 3 to 15 in number, cooperate with a series of tabways 52 extending inwardly off of the outer circumference of the shaft 50. The cooperation between the tabs 122 and the tabways 52 solidly interconnect the friction disk 121 to the shaft for rotation therewith. This construction is simple while at the same time providing for more accurate interconnection between the friction disk 121 and the drive shaft, this in contrast with the more conventional triangular splines normally used for this interconnection. Further, the significant width of the tabs 122 efficiently pass the torque between the friction disk 121 and the shaft 50 on which the disks 21 are mounted.

Figure 10:
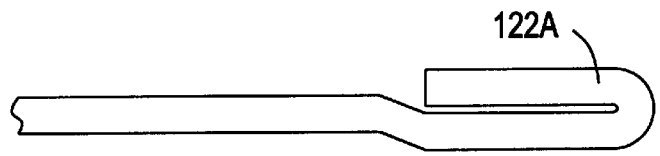
FIG. 10 is an enlarged sideward section of the tabs on the friction disk of FIG. 3 in a fold back configuration.
Figure 11:
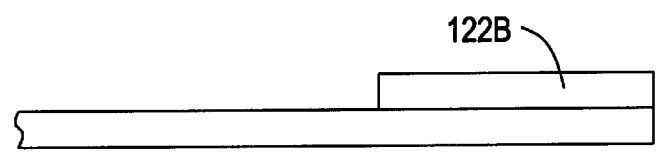
FIG. 11 is a view like FIG. 10 using a separate reinforcing part.
Figure 12:
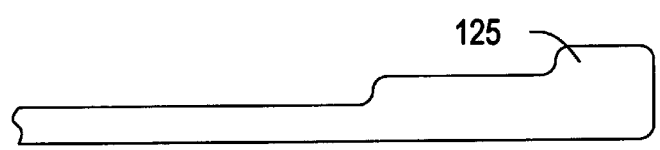
FIG. 12 is a view like FIG. 10 using a multiple depth integral stamping for a tab; and, FIG. 13 is a view like FIG. 3 of a modified friction disk utilizing tabs in conjunction with alternating splines.
Figure 13:
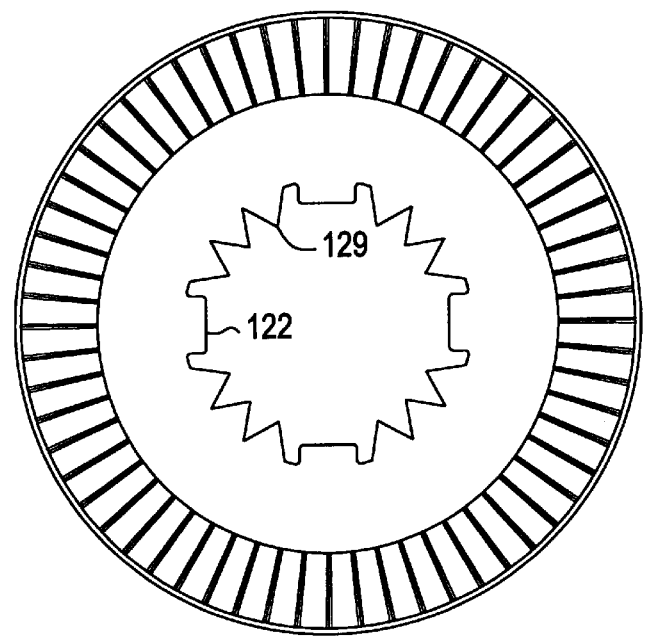

It is preferred that the tabs 122 be reinforced. This reduces the unit area loading on the ends of the tabs, thus allowing for greater longevity at a minimal extra cost. This reinforcing can be provided by bending an extra length tab 122A back on itself (FIG. 10; preferably with a brazing, welding, or other affixing operation therebetween), by using separate reinforcing parts 122B (FIG. 11; flat or with an in line design as shown in FIG. 10, again with an affixing operation), a multiple depth integral stamping/extrusion inner area 125 (FIG. 12), or otherwise. Note the inner hole in the later described reaction disk 125 would be sized so as to provide sufficient clearance for this interconnection. The tabs 122 could also be incorporated into a traditional design connection utilizing alternating triangular splines 129. The reason for this is that the tabs 122 could initially localize the brake disks 121 to the shaft 50, thus minimizing stationary creep, while the more traditional splines 129 would handle the higher torque of moving braking functions (FIG. 13).

Preferably the tabs 122 extend off of the circumference of the inner hole 123 substantially parallel to a line 115 drawn from the middle of the tab to the center of the disk 121. (In the embodiment shown, this is substantially +20° in respect to a line 116 perpendicular or normal to the circumference of the inner hole 123 at the root of the tab 122.) This concentrates the transfer of torque near the intersection between the tab 122 and friction disk 121. The tab 122 should extend in a range of +10° to −30° in respect to this parallel line (+30° to −10° in respect to the normal).

In the particular preferred embodiment disclosed, the friction disk 121 is substantially 4" in diameter having a 1.9" inner hole 123 formed therein. There are four tabs 122 some 0.38" long and 0.15" thick (FIG. 10; double disk depth) leaving a spacing of 1.59" between opposing tabs. The disks themselves are 0.072" thick. There are four tabs 122 and four friction disks 121 utilized in the preferred embodiment disclosed. The splines 129 of FIG. 13 have a pressure angle of substantially 30° (20° to 40° range) and an inner extension of 0.07". Both sides of the disks 121 included 0.5" band of friction material such as sintered bronze.

The drive shaft 50 and the tabways 51 therein are sized to substantially match the dimensions of the inner hole 123 and the and the tabs 122 respectively with a 0.01" to 0.015" radial and circumferential clearance.

Figure 6:
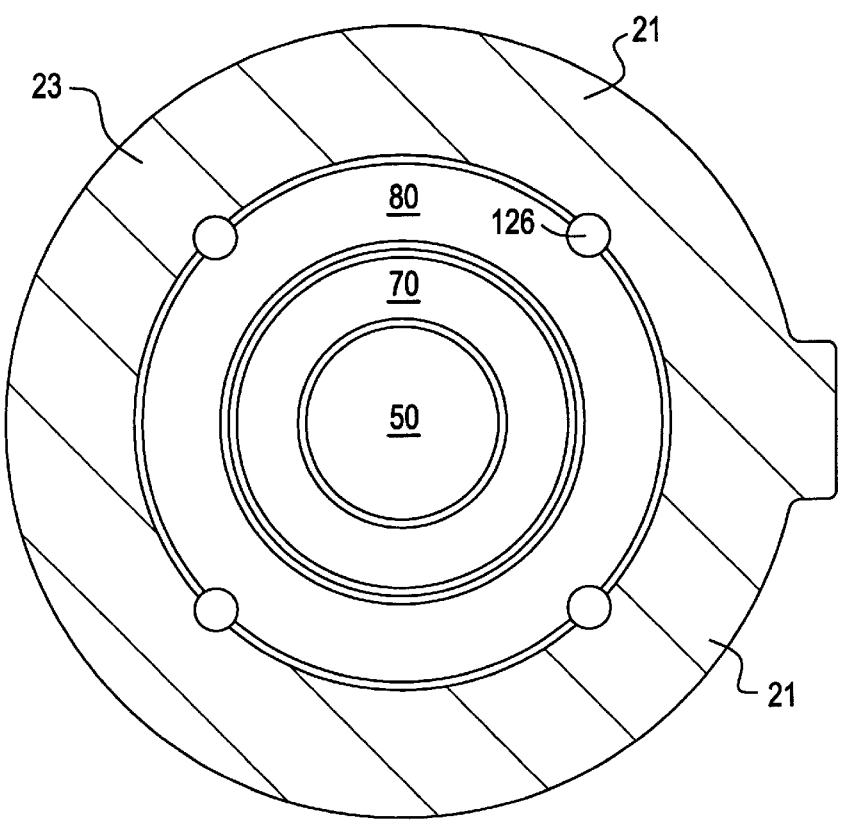
FIG. 6 is a cross-sectional view of the housing of the device of FIG. 4 taken substantially along lines 6—6 therein.
Figure 7:
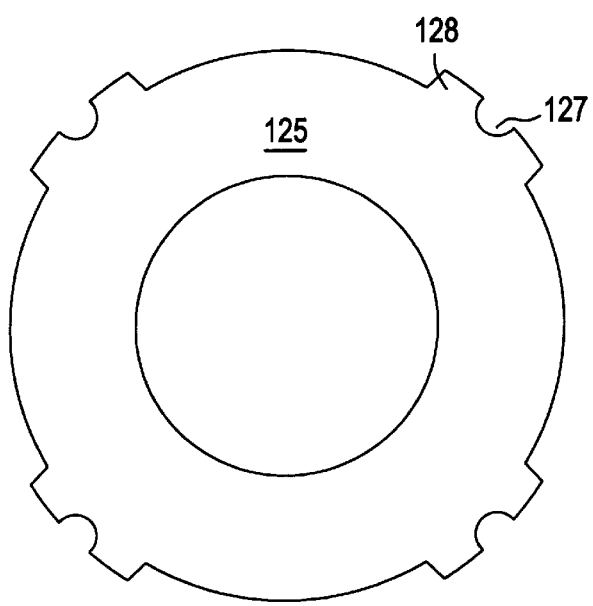
FIG. 7 is a side view of the reaction disk utilized with the of FIG. 6.

Alternating with the friction disks 121 are a series of reaction disks 125. These reaction disks are interconnected with the housing 20 in a non-rotative manner. The number of reaction disks is preferably substantially the same as the number of friction disks. Since any rotation of the reaction disks 125 in respect to the housing 20 would allow for some lash, it is preferred that the reaction disks 125 are supported solidly to the housing. In the embodiments of FIGS. 1, 6, and 7, this solid connection is provided by a series of a number of pins 126 pressed into holes in the housing about the reaction disks 125. These pins 126 interconnect with corresponding grooves 127 cut into extended areas 128 about the outer diameter of the reaction disk 125. The number of pins 126 and grooves can vary as necessary or desired. Three to eight are preferred; four are shown. This construction allows for the accurate location of the reaction disk 125 in respect to the housing 20 via four accurately drilled holes for the pins 126, thus for more precisely locating the reaction disk 125 in respect to the housing 20 while avoiding brake lash. Further, this is accomplished without the necessity of machining the cast housing of the housing 20 of the brake assembly 10 about the disks 125 thus keeping cost at a minimum.

In the particular preferred embodiment disclosed, the reaction disk 125 is substantially 4" in diameter having a 2.2" inner hole formed therein. There are four extended areas 128 some 0.17" long extending off of the outer circumference of the disk 125. Four 0.31" semi-circular grooves 127 are centered on the extended areas 128 at a 4.34" diameter bolt circle. The disks themselves are approximately 0.07" thick. They are coated with a reaction material such as iron phosphate on both sides.

The pins are sized to substantially match the grooves 127. The opening in the housing containing the disks has a diameter slightly greater than the 4.34" diameter of the disks.

Figure 8:
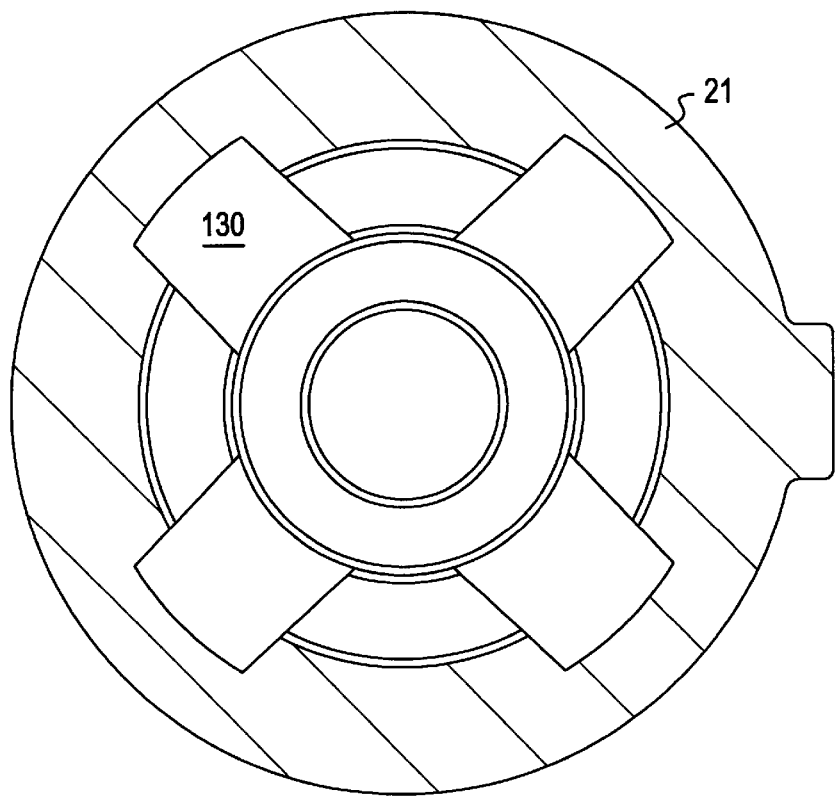
FIG. 8 is a view like FIG. 6 of an alternate housing construction.
Figure 9:
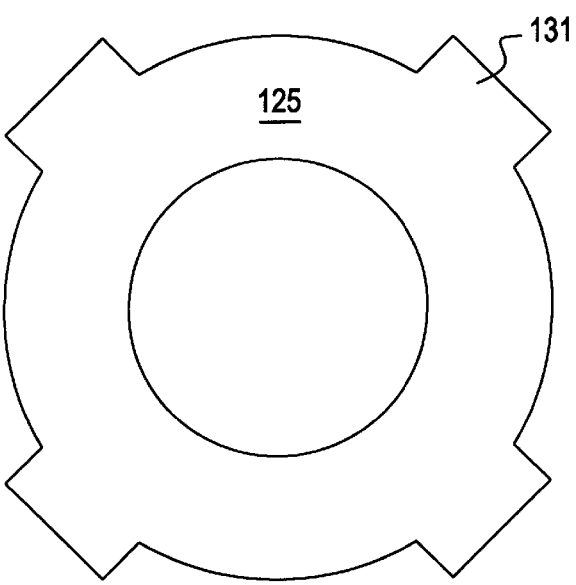
FIG. 9 is a side view of an alternate reaction disk to be utilized with the housing of FIG. 8.

In an alternate embodiment of FIGS. 8 and 9, four slots 130 are cast into the housing with four corresponding 131 extensions holding the reaction disk 125 against rotation in respect to the housing 20. Side clearances are from 0.01" to 0.020". End clearances are greater.

Either embodiment provides for a more solid interconnection between the reaction disks 125 and the housing 20 as compared to the more typical triangular splines utilized at this location.

The particular brake mechanism 100 disclosed in this application is a "wet" brake. By this it is meant that the cavity 30 containing the brake mechanism contains hydraulic fluid, albeit substantially unpressurized. This cools the brake mechanism in addition to facilitating the removal of the residue of the friction material which is inevitable in any braking operation. Preferably, there is a connection 140 provided to an overflow mechanism thus as to allow for breathing of the fluid in the cavity in addition to allowing for the release of any pressurized fluid which might leak from the actuation cavity 131 into the center of the device surrounding the brake mechanism 100. This interconnection also allows for the fluid fluctuation which is inherent in the device upon the movement of the piston 120 in the routine operation of the device. It is preferred that this overflow mechanism be a line leading to a tank or reservoir, thus to provide for reliable operation. (The same as that providing fluid to the pressure mechanism connected to port 130 is further preferred for simplicity and low cost.)

If it is desired to use the brake 10 without a reservoir or tank, this can be otherwise provided by using a hydraulic line (preferably with a filter on its end to prevent outside contamination) or a small tank directly at port 140 to provide for fluid movement.

Figure 4:
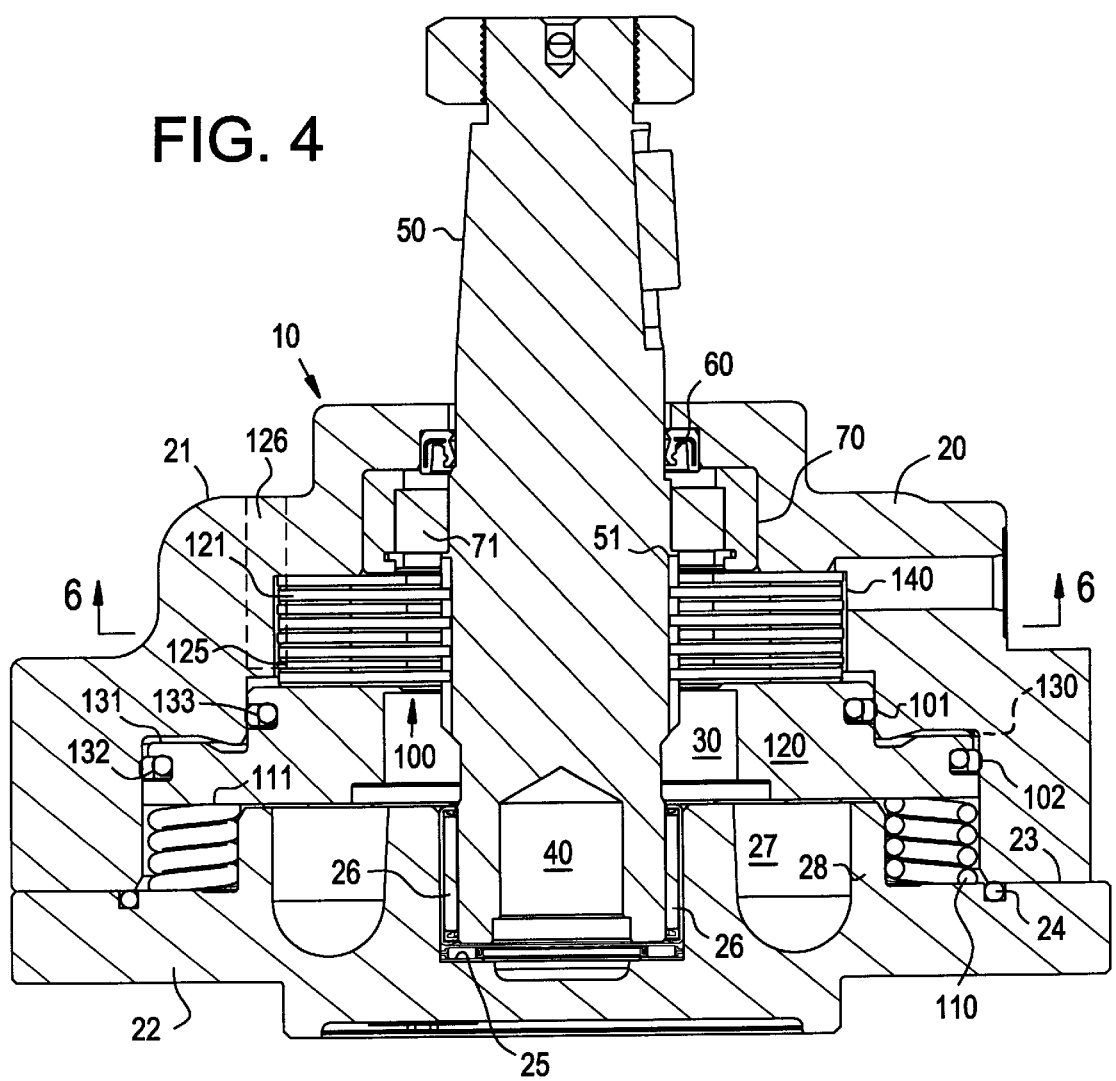
FIG. 4 is a longitudinal cross-sectional view of a spring operated hydraulically brake and axle support device with which the brake shaft of FIG. 1 is utilized.
Figure 5:
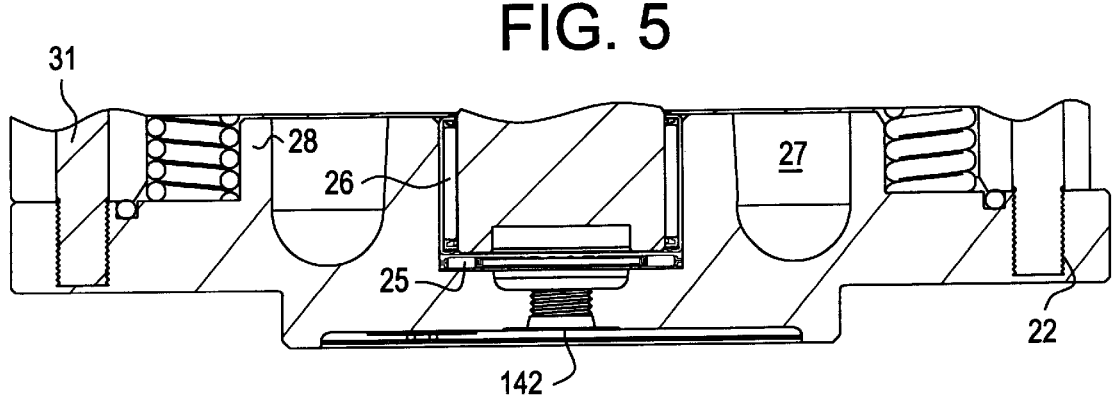
FIG. 5 is a modification to the device of FIG. 4 showing an alternate location for the hydraulic fluid line.

The interconnection between the cavity 30 and the overflow mechanism is not critical. This can be provided by a hole 140 surrounding the brake disks (FIG. 4), by a hole 142 in the end plate (FIG. 5), or otherwise as desired. A radially extending hole like 140 is preferred in order to ease the mounting of the brake assembly onto an associated vehicle. The reason for this is that all the hydraulic lines could then be located at substantially the same location in the same part in respect to the housing 20.

Although the invention has been described in its preferred form with a certain degree of particularity, it is to be understood that changes can be made deviating from the invention as hereinafter claimed.

For example, although the device disclosed with a friction disk utilizing tabs 122 and a reaction disk using pins 126, it would be possible to combine either of these with conventional components so as to provide for a good measure of the included invention. An example of this would be to use a conventional reaction disk (FIG. 13 modified so that only triangular splines 129 would be present and the tabs 122 would be replaced thereby) or to use the friction disks having the tabs 122 with a conventional reaction disk having alternating external triangular splines (like 129) about its outer circumference or other conventional interconnection to the surrounding housing part 21. Other modifications can also be made without deviating from the invention as hereinafter claimed.

What is claimed is:

1. In a brake mechanism having a shaft selectably rotatable in respect to a housing, the shaft connected to a selectably engageable brake having a brake disk non-rotatively connected to a part having a circumference, the brake mechanism characterized by including tabs, said tabs extending off of one of the part or the brake disk, said tabs having an angle in the range of minus ten to plus thirty degrees in reference to a line perpendicular to circumference of the part or brake disk respectively, key slots, said key slots being in the other of the part or brake disk, said key slots matching said tabs, said tabs interconnecting with said key slots to non-rotatively interconnect the part to the brake disk, splines, said splines extending off of one of the part or the brake disk, corresponding teeth, said corresponding teeth extending off of the other of the part or brake disk, and said splines and said corresponding teeth acting with said tabs to non-rotatively interconnect the part to the brake disk.

2. The brake mechanism of claim 1 characterized in that the part is the shaft.

3. The brake mechanism of claim 1 characterized in the the part is the housing.

4. The brake mechanism of claim 1 characterized in that said angle is substantially plus twenty degrees.

5. The brake mechanism of claim 1 characterized in that said angle is substantially zero degrees.

6. The brake mechanism of claim 1 wherein the selectably engageable brake has a second brake disk non-rotatively connected to a second part having a circumference, and characterized by pins, said pins extending off of one of the second part or the second brake disk, grooves, said grooves being located in the other of the second part or the second brake disk, said pins being located in said grooves of the second part or second brake disk respectively, and said pins drivingly interconnecting to said grooves to non-rotatively interconnect the second part to the second brake disk.

7. In a brake mechanism having a shaft selectably rotatable in respect to a housing, the rotation of the shaft controlled by selectably engageable first and second brake disks non-rotatively connected to the housing and shaft respectively, the brake mechanism characterized by including tabs, said tabs extending off of one of the shaft or the second brake disk, said tabs having an angle in the range of minus ten to plus thirty degrees in reference to a line perpendicular to circumference of the shaft or second brake disk respectively, key slots, said key slots being in the other of the shaft or second brake disk, said key slots matching said tabs, said tabs interconnecting with said key slots to non-rotatively interconnect the part to the second brake disk, splines, said splines extending off of one of the shaft or the second brake disk, corresponding teeth, said corresponding teeth extending off of the other of the shaft or second brake disk, and said splines and said corresponding teeth acting with said tabs to non-rotatively interconnect the shaft to the second brake disk.

8. The brake mechanism of claim 7 characterized in that said tabs extend off of the second brake disk.

9. The brake mechanism of claim 7 characterized in that said angle is substantially plus twenty degrees.

10. The brake mechanism of claim 7 characterized in that said angle is substantially zero degrees.

11. The brake mechanism of claim 7 characterized by pins, said pins extending off of one of the housing or the first brake disk, grooves, said grooves being located in the other of the housing or the first brake disk, said pins being located in said grooves of the housing or first brake disk respectively, and said pins drivingly interconnecting to said grooves to non-rotatively interconnect the housing to the first brake disk.

12. In a brake mechanism having a shaft selectably rotatable in respect to a housing, the rotation of the shaft controlled by selectably engageable first and second brake disks non-rotatively connected to the housing and shaft respectively, the brake mechanism characterized by including tabs, said tabs extending off of the second brake disk, said tabs having an angle of substantially plus twenty degrees in reference to a line perpendicular to circumference of the second brake disk respectively, key slots, said key slots being in the shaft, said key slots matching said tabs, and said tabs interconnecting with said key slots to non-rotatively interconnect the shaft to the second brake disk, splines, said splines extending off of the second brake disk, corresponding teeth, said corresponding teeth extending off of the shaft, and said splines and said corresponding teeth acting with said tabs to non-rotatively interconnect the shaft to the second brake disk.

13. The brake mechanism of claim 12 characterized by pins, said pins extending off of the housing, grooves, said grooves being located in the first brake disk, said pins being located in said grooves of the first brake disk respectively, and said pins drivingly interconnecting to said grooves to non-rotatively interconnect the housing to the first brake disk.

14. The brake mechanism of claim 12 characterized by extended portions, said extended portions extending off the first brake disk and said grooves being located in said extended portions.

15. In a brake mechanism having a shaft selectably rotatable in respect to a housing, the rotation of the shaft controlled by selectably engageable first and second brake disks non-rotatively connected to either the housing and shaft respectively, the brake mechanism characterized by including pins, grooves, said grooves being located in both the housing and the first brake disk, which housing groove is radially outward of the first brake disk, said pins being located in said grooves of the housing and first brake disk respectively, and said pins drivingly interconnecting said grooves to non-rotatively interconnect the housing to the first brake disk.

16. The brake mechanism of claim 15 characterized by extended portions, said extended portions extending off the first brake disk and said corresponding grooves being located in said extended portions.

17. The brake mechanism of claim 15 characterized in that said pins extend off of holes in the housing axially aligned with said grooves therein.

18. The brake mechanism of claim 15 characterized by tabs, said tabs extending off of one of the shaft or the second brake disk, said tabs having an angle in the range of minus ten to plus thirty degrees in reference to a line perpendicular to circumference of the shaft or second brake disk respectively, key slots, said key slots being in the other of the shaft or the second brake disk, said key slots matching said tabs, and said tabs interconnecting with said key slots to non-rotatively interconnect the shaft to the second brake disk.

19. In a brake mechanism having a shaft selectably rotatable in respect to a housing, the rotation of the shaft controlled by selectably engageable first and second brake disks non-rotatively connected to the housing and shaft respectively, the brake mechanism characterized by including pins, the first brake disk having extended portions, grooves, said grooves being located in said extended portions of the first brake disk, said pins being located in said grooves of said extended portions of the first brake disk, second grooves, said second grooves being located in the housing radially outward of said extended portions of the first brake disk, said pins also being located in said second grooves, and said pins drivingly interconnecting to said grooves and said second grooves to non-rotatively interconnect the housing to the first brake disk.

20. The brake mechanism of claim 19 characterized by tabs, said tabs extending off of the second brake disk, said tabs having an angle of substantially plus twenty degrees in reference to a line perpendicular to circumference of the second brake disk respectively, key slots, said key slots being in the shaft, said key slots matching said tabs, and said tabs interconnecting with said key slots to non-rotatively interconnect the shaft to the second brake disk.

21. In a brake mechanism having a brake disk with a width and a part, the improvement of a tab, said tab having an end, said end having a thickness, said thickness of said end of said tab being greater than said width of the brake disk to reinforce said end, and said end of said tab non-rotatively interconnecting the brake disk to the part.

22. In a brake mechanism having a brake disk and a radially adjoining part, the improvement of a groove, said groove being located in one of the brake disk or radially adjoining part, a second groove, said second groove being located in the other of the brake disk or the radially adjoining part, said second groove being radially located in respect to said groove, a pin, and said pin being in said groove and said second groove non-rotatively interconnecting the brake disk to the radially adjoining part.

23. The brake mechanism of claim 22 characterized by the addition of said pin being fixedly interconnected to said radially adjoining part.

24. The brake mechanism of claim 23 characterized in that said radially adjoining part has a section axially adjoining the brake disk and characterized by the addition of a hole, said hole being in said axially located section, and said pin being fixedly interconnected in said hole.

25. The brake mechanism of claim 24 characterized in that said hole is axially aligned with said groove in said radially adjoining part.

26. The brake mechanism of claim 25 characterized in that said pin is interconnected to said radially adjoining part only by said groove and said hole.

27. The brake mechanism of claim 26 wherein the brake mechanism has an actuation mechanism selectively engaging the brake disk and characterized in that said pin is not a part of said actuation mechanism.

28. In a brake mechanism having a brake disk with a radial circumference and a radially adjoining part with a radial circumference, the improvement of a pin, said pin engaging both the circumference of the brake disk and the circumference of the radially adjoining part and said pin non-rotatively interconnecting the brake disk to the radially adjoining part.

* * * * *